US011422810B2

(12) United States Patent
Lafikes

(10) Patent No.: US 11,422,810 B2
(45) Date of Patent: Aug. 23, 2022

(54) MACHINE AND PROCESS FOR BRANCH SELF-GENERATION IN A CHANGE SERVER

(71) Applicant: The Boeing Company, Chicago, IL (US)

(72) Inventor: Christopher L. Lafikes, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 586 days.

(21) Appl. No.: 16/442,085

(22) Filed: Jun. 14, 2019

(65) Prior Publication Data

US 2020/0394037 A1 Dec. 17, 2020

(51) Int. Cl.
*G06F 8/658* (2018.01)
*G06F 9/30* (2018.01)
*G06F 3/06* (2006.01)

(52) U.S. Cl.
CPC ............ *G06F 9/3005* (2013.01); *G06F 3/067* (2013.01); *G06F 3/0607* (2013.01); *G06F 3/0634* (2013.01); *G06F 8/658* (2018.02)

(58) Field of Classification Search
CPC ....................................................... G06F 8/658
See application file for complete search history.

(56) References Cited

U.S. PATENT DOCUMENTS

| | | | | |
|---|---|---|---|---|
| 10,606,585 | B1 * | 3/2020 | Safronoff | .................. G06F 8/71 |
| 11,003,575 | B1 * | 5/2021 | Knajtner | ............. G06F 16/2379 |
| 11,294,664 | B2 * | 4/2022 | Sagal | ........................ G06F 8/71 |
| 2015/0227533 | A1 * | 8/2015 | Goldstein | ............. G06F 16/958 |
| | | | | 707/661 |
| 2016/0267095 | A1 * | 9/2016 | LeBert | .................... H04L 67/02 |

* cited by examiner

*Primary Examiner* — Duy Khuong T Nguyen
(74) *Attorney, Agent, or Firm* — Yee & Associates, P.C.

(57) ABSTRACT

A machine and process for branch self-generation in a change server that provide a technical solution via a practical application that reduces: a need for storage use in a memory, and a volume and time required for transmission of date responsive to inputs for creating, updating, querying, or deleting parts of a master baseline. The master baseline may serve utilities providing at least analysis, configuration, and allocations for a control unit in an object. The change server self-generates a branch utilizing a singular persistent imported baseline copy of the master baseline. Validation, export, and replay of the branch onto the master baseline eliminate a need for use of running exports to the master baseline through a differences analyzer.

20 Claims, 7 Drawing Sheets

MACHINE AND PROCESS FOR BRANCH SELF-GENERATION IN A CHANGE SERVER

BACKGROUND INFORMATION

1. Field

The present disclosure relates generally to a computer configuration system and, in particular, to a machine and process for improving a computer configuration, via self-generating branches that reduce memory usage and transfer volumes.

2. Background

An object may have many control units that execute functions to support the purpose of the object. The object may be, without limitation, a building or a vehicle. Control units for a building may, without limitation, monitor and/or regulate operations for the building such as, without limitation: entertainment systems, energy resourcing and/or distribution, environmental controls, communications networks, physical access, storage, transportation issues, interfacing between control units, structural support, and/or security concerns which may be, without limitation, physical or electronic. Control units for a vehicle such as, without limitation, an aircraft may monitor and/or regulate operations for the aircraft such as, without limitation: navigation, flight control, weapons systems, entertainment systems, energy resourcing and/or distribution, environmental controls, communications networks, physical access, storage, transportation issues, interfacing between control units, structural support, and/or security concerns which may be, without limitation, physical or electronic.

Computer servers may contain memory storing program code that dictates at least: analysis, configuration, and allocation of operations in control units that interface with the computer servers that service the operation of an object that utilizes the control units. Current memory requirements consume more resources and expense than desired to store and manage changes for analysis, configuration, and allocation of operations in control units serviced by the computer servers. Without limitation, existing: maintenance, analysis, administration, and integration with, or transport of, computer codes and/or data for computer servers is costly and requires an amount of physical and human resources that may be greater than desired.

Likewise, development and/or modification of a massive amount of program code and/or memory required for configuring or operating the control units of the object currently requires massive amounts of transfer and storage of the program code into, and out of, persistent and/or working memory areas of repositories supporting development and/or maintenance for the development and/or modification of the program code. The transfer requirements may consume more time, resources, and expense than desired.

Currently, without limitation, a complexity, a cost, and/or resource demands a computer server requires may be greater when the computer server must provide services to multiple control units that may each require service from and/or uploads to distinct portions of the computer server at differing time intervals. Some of the distinct portions and functions coded therein may be interdependent with each other. The portions and functions coded therein may include, without limitation: configuration utilities, data utilities, support utilities, analysis utilities, query utilities, storage utilities, and/or allocation facilities.

Currently, developing or maintaining computer servers that service multiple control units involves architecture with memory storage for a master baseline configured to service all control units that interface with the computer server. The master baseline includes a set of program code and supporting data stored in a memory of the computer server. The master baseline may be considered the program in the computer server that currently functions to direct operations by the control units as well as, without limitation, interfacing amongst, and exchanges with, control units served by the computer server.

Currently, development or modification of the master baseline requires round-trip processing that involves: an initial import that pulls a complete copy of an entire content of the master baseline, which constitutes an imported baseline, into a persistent storage of a repository large enough to store the imported baseline; programming updates to the imported baseline to form an updated baseline, as well as storage and maintenance of the updated baseline in the persistent storage for the computer server; and then an export of the updated baseline, in its entirety, to the master baseline. Current machines and processes for developing or updating a master baseline require fully replicating this round-trip processing for each developmental or update branch initiated. Thus, massive amounts of storage and export transports may be consumed with multiple imported baselines.

Thus, as a non-limiting example, during development or modification of program code for a master baseline that may serve multiple control units for an object, if several different options are being simultaneously developed or modified for incorporation into some portion of an existing version of a master baseline under development or modification, each design option would require its own complete import of an entire content of the master baseline for its development.

FIG. 1 illustrates a representation of the prior art, where current architectures to develop, modify, and/or update a system for configuration and data utilities for a control for an object. Specifically, FIG. 1 shows that under current control system 100, the architecture required to develop, modify, and/or update a system for configuration and data utilities for a control for an object for any desired change to master baseline 102 requires a complete import and replication of master baseline 102 into system repository 104.

Master baseline 102 may be an interface control document that commands operations for control unit 106 in object 108. Master baseline 102 may have been developed/created based upon part specifications 110 and/or requirements 112 and/or other commands/inputs from originators 114. Originators 114, may be, without limitation: a designer, a manufacturer, or a user of control unit 106 and/or object 108. Control unit 106 in FIG. 1 is a single representation for any number of control units that may be used to control object 108. Queries to read data in master baseline 102 and/or inputs to make changes thereto may interface with system repository 104 via a number of data input/view interfaces represented in FIG. 1 collectively by singular data input/view 116.

As illustrated in FIG. 1, if a change is desired for master baseline 102 that involves any change to program coding retained within master baseline 102 creating additional code (only adding new coding) for the master baseline, then an entire copy of master baseline 102 must imported by importer 118 and be copied into and stored within the memory of system repository 104. Changes may be, without limitation, as inputs to create, read, update, and/or delete coding that exists in master baseline 102. A similar import and storage process is required for each session of changes added for master baseline 102. Thus, storage requirements in system repository 104 continue to expand with each desired change. As a non-limiting example, FIG. 1 illustrates storage demands for just six change inputs, represented by import for change 1 120, import for change 2 122, import for change 3 124, import for change 4 126, import for change 5 128, and import for change 6 130.

Development and/or maintenance of master baseline 102 could include a number of imported baselines being required and thus additional master baseline copies being transferred, stored, and manipulated in system repository 104 as some number of import for change numbered copies until storage space or maintenance capabilities thereof reach some structural or other system limit. Hence, where numerous development or modification options exist, a technical problem exists whereby retaining a record of change to master baseline 102 as another import for change document, then a massive amount of importing into and persistent storage in system repository 104 becomes required to store all the import for change copies of master baseline 102 with for each change being developed or modified.

Further, in cumulative, a massive amount of redundant export is required to transport each updated baseline back over the master baseline when it is validated and approved for overwrite of the master baseline.

Further, such current computer program development and update systems have the technical problem that simultaneous derivations between any two of the import for change documents may not be developed and/or explored. This leaves the technical problem that compatibility or preference evaluations between simultaneously developed variations, between as a non-limiting example changes to master baseline 102 copied in import for change 1 120, and changes in import for change 2 122 require comparative tests on each of import for change 1 120 and import for change 2 122. When interaction between changes in import for change 1 120 and changes in import for change 2 122 must be evaluated or validated, differences analyzer 132 must run to identify and then merge changes onto a newly created input for change file such as input for change file 5 and then run that file through validator 134 interfacing with either virtual control unit 136 or control unit 106.

Additionally, current computer program development and update systems have the technical problem that to replay or merge changes in one of the import for change documents onto master baseline 102 requires differencing algorithm 140 in differences analyzer 132 to run on every piece of coding and/or data being exported to replay onto/merge/update/replace master baseline 102 and produce export 138 that may then be exported for replay onto/merge/update/replace master baseline 102. After validating the changes in a selected import for change document, differencing algorithm 140 is required to separate all the changes out of the coding in the import for change document so that the updates coded into the updated baseline can be replayed/merged onto master baseline 102.

Hence, validation and evaluation of any number of imports for change 1 120 through import for change 6 130 files requires fully processing the entire document of each import for change file. Thus, full processing each import for change file is required for each validation and/or evaluation. Generally, each import for change file will be at least the size of master baseline 102.

Thus, currently, developing or maintaining a computer server to service configuration and data utilities that control for an object run by multiple control units, such as current control system 100 of FIG. 1, involves an architecture and memory storage that does not allow creation of divergent and isolated views of updates contained in a resource development framework.

Therefore, it would be desirable to have a machine and process that take into account at least some of the issues discussed above, as well as other possible issues. For example, it would be desirable to have a machine and process that overcome technical problems with current computer architecture and functionality limitations with development and modification of computer server programs that require: large amounts of persistent storage, entire content exports, and a differencing algorithm to separate updates within an updated baseline. In other words, it would be desirable to have a machine and a process that provide a concrete assignment of specified functions among a computer's components to improve computer memory storage utilization and reduce an amount of at least a processing and/or a transfer time, resources, energy, and memory, master baseline 102 program stored in a computer memory.

Accordingly, it would be desirable to have a computer server for multiple control units that involves an architecture with memory storage that allows creation of divergent and isolated views of updates contained in a resource development framework, such that a machine and process exist to produce and update to a particular portion of a master baseline without affecting other users or developers. Likewise, it would be desirable to have a machine and process to form and export development and/or changes to a master baseline that are simpler and more compact than current formats and devoid of a need for a differencing algorithm.

SUMMARY

An embodiment of the present disclosure provides a machine that includes a change server specially programmed to service a master baseline, such that the change server comprises a memory that comprises a first code configured to respond to an input with a generation of a branch from an imported baseline within the change server. The master baseline comprises a code specially programmed to service multiple control units. The branch is configured to generate and store a code change that comprises at least one of: a creation, an update, or a deletion, to the imported baseline. The branch is configured to minimize an amount of a persistent storage required. The branch is configured to minimize an amount of and a processing time for an export from the branch to the master baseline. The export includes the code change and excludes the imported baseline and an output from a differences analyzer.

The change server includes the imported baseline and an import/export server in communication with the master baseline. The distinct from and in communication with the imported baseline. The imported baseline serves as a specially programmed singular surrogate for the master baseline and is in communication with every branch generated by the change server. Each branch resides within the persistent storage within the change server.

Therefore, the branch is configured to minimize a time required to retrieve the master baseline and store the imported baseline; and the generation is a self-generation by and within the change server. In other words, upon receipt of a create, query, update, or delete, input from a program manipulator, the change server interfaces with the imported baseline and generates a new branch in the persistent storage of the memory of the change server to store the data/code related to the input. The change server and a code change validator may reside within a computer server. The creation, a query, the update, and the deletion may be received by the change server from a program manipulator.

The multiple control units may be located in an object including, without limitation: a building, and a vehicle. The vehicle may be, without limitation, an aircraft.

Another embodiment of the present disclosure provides a process for reducing persistent storage required in a storage device for a computer server in accordance with an illustrative embodiment. The process includes importing, responsive to a first input into a change server from a program manipulator, a master baseline into the change server, thus forming and storing an imported baseline in a memory of the change server. The process includes generating, by and in the change server, a branch communicating with the program manipulator. The process includes generating, using the program manipulator, code change in the branch for executing changes to the imported baseline. The process includes exporting the code change from the change server and replaying the code change onto the master baseline.

The change server is in communication with a control unit configured for service by the master baseline. The code change provides the technical advancement of eliminating using a differences analyzer before exporting any code from the change server to the master baseline.

The imported baseline is stored in the persistent storage of the change server only once, and thereby enables servicing every branch generated within the change server. The code change includes at least one of: a creation, a query, an update, or a deletion, for the master baseline.

The process for reducing storage required in a storage device of a computer server further includes validating an efficacy of the code change for servicing a control unit before exporting the code change for replaying onto the master baseline. The process for reducing storage required in a storage device of a computer server further includes as well, the change server generating, responsive to a second input from a second program manipulator, a second branch serviced by the imported baseline.

Yet another embodiment of the present disclosure provides a process for reducing an export from a change server to a master baseline servicing multiple control units for an object. The process includes creating, by and storing within the change server, a singular imported baseline replicating the master baseline. Responsive to an input from a program manipulator, the process includes self-generating, by and storing within the change server, a branch communicating with the program manipulator.

The process for reducing an export from a change server to a master baseline servicing multiple control units for an object also includes creating, using the program manipulator, a code change for the master baseline, and exporting, without running a differencing algorithm, the code change for replaying onto the master baseline. The code change includes at least one of: a creation, a query, an update, or a deletion, for the master baseline. The process also includes the change server retaining the singular imported baseline undisturbed and thereby preserving a roll-back capability for any branch to the singular imported baseline.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
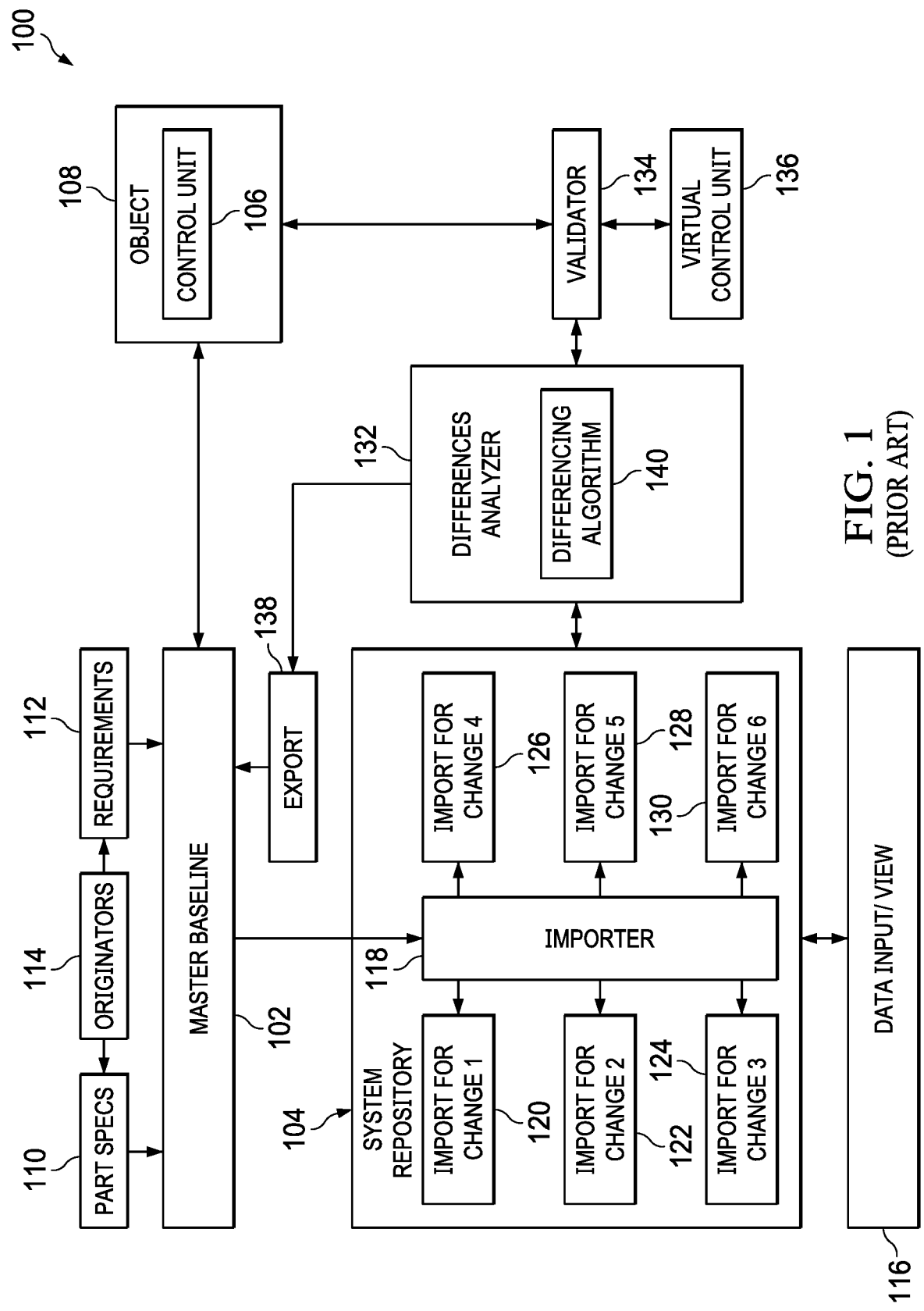
FIG. 1 is an illustration of a current control system and architecture in accordance with an illustrative embodiment.

The illustrative embodiments recognize and take into account one or more different considerations. For example, the illustrative embodiments recognize and take into account that currently used systems for providing a capability to create, query, update, or delete coding that controls allocation, configuration, or analysis of operations of and interaction between control units in an object have the technical deficiency of requiring amounts storage and transfer volumes, and associated administrative upkeep, far greater than desired. Thus, without limitation, the volumes transferred can be coding for control, configuration, analysis, resource allocations, or data resources for any of these processes. The current amounts of storage and transfer volumes required drive excessive costs for the operation and upkeep of the control units. The term upkeep may indicate, without limitation: operation, archiving, servicing, and auditing of each control unit to include, without limitation, its program code and programming therefore.

The illustrative embodiments described herein recognize and take into account that it would be desirable to have a technological solution that minimizes data storage by only persisting changed elements to a master baseline. The illustrative embodiments described herein eliminate the current need to store a duplicate imported baseline for each instance of any change option to develop or modify a master baseline, while providing a more streamlined consistent and isolated branch for each option and updates therein. The illustrative embodiments herein describe a streamlined branch system not only reduces storage and transfer volumes required under current architecture, but also provide a roll back capability to an imported baseline if needed.

The illustrative embodiments described herein further recognize, and take into account, that it would be desirable to have a technological solution that isolates updates within independent branches that allow multiple development or modification updates to be generated concurrently without the need to copy and store a full content of a master baseline for each independent branch. As well, the illustrative embodiments described herein recognize that currently formulated changes for a preexisting master baseline require a differencing algorithm to identify all differences from the preexisting master baseline in order to merge a modified imported baseline into the master baseline. Differences may include variances in program code or data stored and/or accessed thereby.

Therefore, it would be desirable to have a machine and a process that provides a concrete assignment of specified functions among a computer's components to minimize required storage in a computer memory as well as reduce an amount of, and thus a transfer time required to export, updates to a baseline program stored in a computer memory. Accordingly, the illustrative embodiments describe a novel machine and process to form and export development and/or changes to a master baseline that are simpler and more compact than current formats and devoid of a need for a differencing algorithm.

Accordingly, the illustrative embodiments herein describe a novel computer change server that manages configurations for multiple control units via a novel architecture with memory storage processes that allow creation of divergent and isolated views of updates contained in a resource development framework, such that a machine and process exist to produce and update to a particular portion of a master baseline without affecting other users or developers or overloading the storage and/or transfer rate or volume capabilities of a particular computer server system. Likewise, the illustrative embodiments herein describe a novel computer change server that manages configurations for multiple control units via a novel architecture with memory storage processes that provide a unique auditing capability of all historical changes on the branch and any export sent to replace/update/merge with/update the master baseline.

In other words, the illustrative embodiments herein simplify round-trip engineering of the baseline development while managing independent data views for multiple users. Round-trip engineering refers to the process of importing master baseline coding, making changes thereto, and then exporting the changes to merge into forming a new master baseline. The illustrative embodiments describe a machine and process that minimize the size of the persistent database, as only changes, and not the entire data set, are stored. Changes are isolated to a specific branch which enables multiple views of the data without disturbing the initial imported master data set. Data export is simplified as only the updates, and not the entire data set, are included. In other words, the export includes the change code from the branch, but in contrast to current change servers, excludes the imported baseline and the now unneeded differencing algorithm output.

Hence, the illustrative embodiments herein describe the practical application of a machine and process that provides a technological advance in computer architecture and functionality that provides a concrete assignment of specified functions among a computer's components to minimize persistent storage required in computer memory storage device, and reduce an amount of, and thus a transfer time required to export, updates to a baseline program stored in a computer memory. Thereby, the illustrative embodiments herein describe at least an improvement based on assigning specially programmed functions to particular computer components and having them interact in specified ways that allow efficient creation of divergent and isolated views of data contained, without limitation, in a Resource Description Framework database. Resource Description Framework database may serve as a master baseline for a control unit that controls a system in an object.

Figure 2:
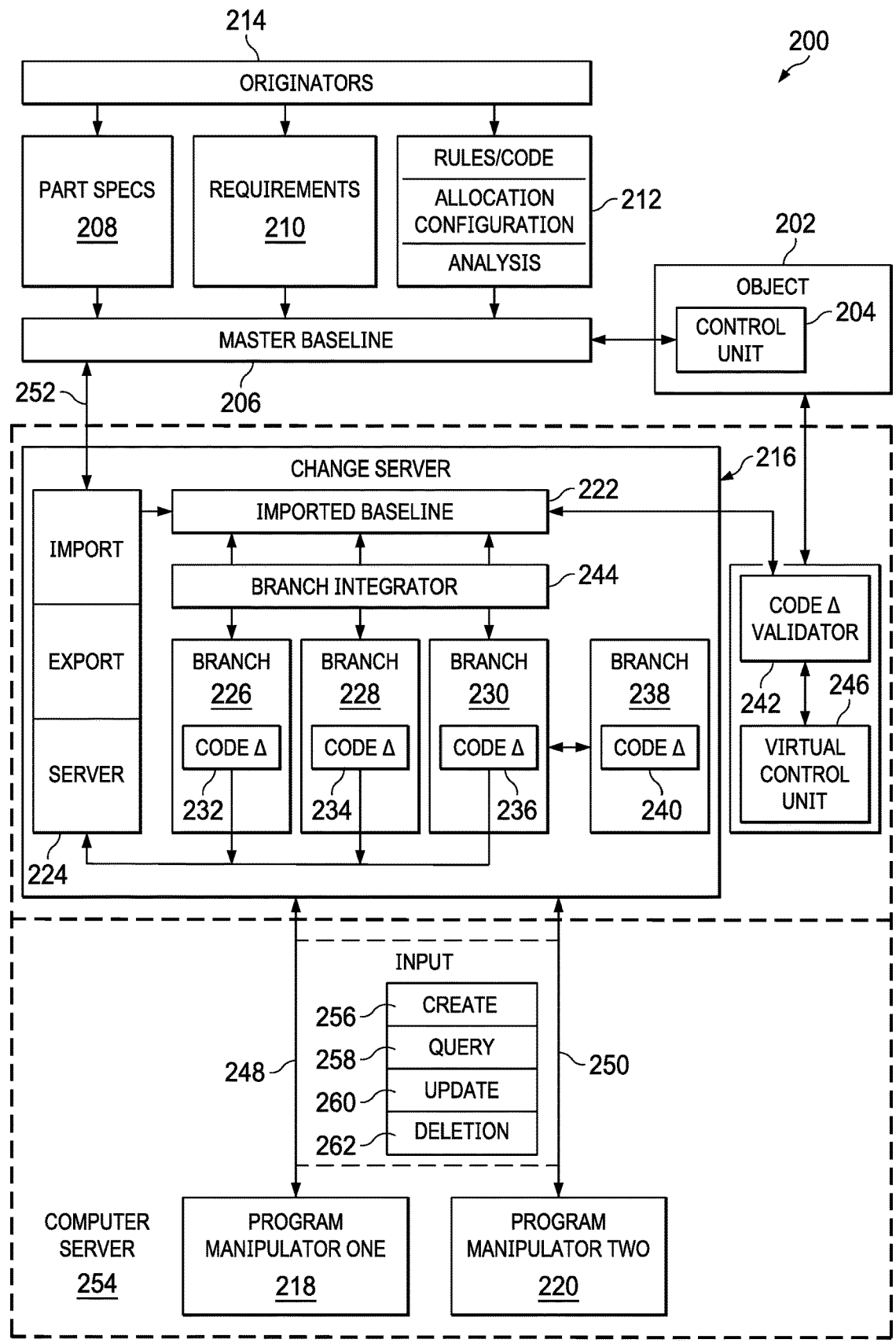
FIG. 2 is an illustration of a novel object control system and novel change server architecture in accordance with an illustrative embodiment.

With reference now to the figures and, in particular, with reference to FIG. 2, an illustration is provided for object control system. More specifically, object control system 200 may be a system that forms a machine configured to control operations for object 202 by controlling operation and interfacing of a number of control units (represented by control unit 204) that control operation of components of the object. As used herein, "a number of" means one or more components. The number of control units for the object may be as numerous as operational need and/or as limitations of the object allow. Object 202 may be, without limitation, a building or a vehicle.

When object 202 is a building, components controlled by control unit 204 may include, without limitation: a heating system, a lighting system, a power system, a structural integrity monitor, a communication system, and/or a security system. When object 202 is a vehicle, such as and without limitation, an aircraft, components controlled by control unit 204 may include, without limitation: an electrical system, a hydraulic system, an oxygen system, an environmental control system, a navigation system, a flight control system, a weapon system, a warning system, a structural integrity monitory, a communication system, and/or a security system.

Additionally, in the illustrative example, object 202 can take a number of different forms. For example, without limitation, object 202 can be selected from a group comprising an assembly, a sub-assembly, a fuselage section, a wing, a wing box, a horizontal stabilizer, a landing gear system, a hydraulic system, a skin panel, a stringer, a fuselage section, a composite fuselage section, and other suitable structures.

Further, object 202 may take a number of different forms. For example, object 202 may be: a mobile platform, a stationary platform, a land-based structure, an aquatic-based structure, and a space-based structure. More specifically, object 202 can be a surface ship, an aircraft, a tank, a personnel carrier, a train, a spacecraft, a space station, a satellite, a submarine, an automobile, a power plant, a bridge, a dam, a house, a manufacturing facility, a building, and other suitable types of objects.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, and without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Coding programmed to control a configuration utility, allocations to and within, an analysis utility, and other data supportive thereof, for control unit 204 may be uploaded from and download to master baseline 206. In other words, master baseline 206 comprises a specially programmed code that may serve as an interface control document for a number of control units, represented without limitation by control unit 204 in object 202.

Thus, master baseline 206 may receive and process, without limitation, part specifications 208, requirements 210, and/or rules/code 212 for directing allocation, configuration, and/or analysis, from various originators 214, for control unit 204. Originators 214 may include, without limitation: developers/designers, and/or manufacturers, and/or maintainers/servicers, for at least one of object 202, control unit 204, and/or other systems with which object 202 and/or control unit 204 may interact.

During development of and/or once master baseline 206 has been formed, changes to the master baseline may be desired. Changes may include, without limitation, creation of more programming, queries that may include links to other coding, updating some coding, and/or deleting some coding, in the master baseline. As previously shown by FIG. 1, currently such changes require importing master baseline into the change server as a copy known as the imported baseline—which may be for creation, query, update, or deletion, of master baseline coding for every instance of such a change.

Particularly when a master baseline involves a massive amount of coding, such as and without limitation amounts in the 3-5 gigabyte range of data, each new import of a master baseline added to a change server increases the processing time and transfer volume on the change server and consumes an equal amount of storage space as the master baseline in a repository for the change server, as illustrated by system repository 104 for each new import for change 120-130 in FIG. 1. Thus, currently, as shown by FIG. 1 as a non-limiting example, if developing or updating six sets of inputs for the master baseline, as represented by import for change items 120-130, then in the range of 18-30 gigabytes of storage base would be required for those six inputs alone. Additional memory is also required for program code involved in processing inputs and exporting each of import for change items 120-130 through the differences analyzer. Hence, simultaneously applying a number of program manipulations to a master baseline, such as shown by master baseline 102 in FIG. 1, is currently limited by a persistent storage capacity available to system repository 104 supporting inputs and/or changes for master baseline 102. In other words, without limitation, a change server with only 20 gigabytes of persistent storage could be limited to no more than developmental, update, or analysis operations for inputs to the master baseline occurring before some of those four operations would have to be removed from the change server to allow for additional operations. Under current change server configurations, such a removal would again require transfer of the full 3-5 gigabyte import for change file.

Furthermore, in current systems for serving changes, such as and without limitation current control system 100, each import or export of each 3-5 gigabyte copy of master baseline 102, such as any one of import for change 120-130, consumes 3-4 hours of processing time and energy. Thus, as shown in FIG. 1, loading import for change 120-130 into system repository 104 can require, 18-24 hours of processing time. Hence, even when a number of simultaneous inputs/changes for master baseline 102 may not be limited by capacity of system repository 104, a limit on processing time and volume to transfer the data that generates or exports an import for change file may limit the number that may be handled. As an example, if seven changes were desired to be evaluated within a 24-hour period, the processing time may prevent reaching the desired goal within 24 hours.

In contrast, with the novel process and architecture of change server 216, when change server 216 receives an input, such as input 248 or input 250, from any of a number of program manipulators, such as and without limitation: program manipulator one 218 or program manipulator two 220, to create, query, update, and/or delete, items for master baseline 206, if imported baseline 222 is not present in the change server 216, then special programming in the change server 216 executes rules that directs import export server 224 to import a copy of master baseline 206 into change server 216 and save it as a singular persistent imported baseline 222. In contrast to multiple copies of master baseline 102, from FIG. 1, replicated as numerous stored import for change files (such as import for change 120-130), change server 216 only stores a singular version of imported baseline 222 used to spawn/grow and communicate with all subsequently generated branches. Hence, to handle 10 simultaneous inputs to create, query, update, and/or delete, items for master baseline 206 only one 3-4 hour, 3-5 gigabyte, download would be required as compared to the 40 hours and 50 gigabytes that are required in current systems. As described below in more detail, each of the 10 branches generated for the 10 desired inputs may require, without limitation, a single kilobyte of data or less and occur in less than a minute. Hence, as compared to current requirements total processing time and storage required to set up for 10 inputs for the master baseline could drop from 50 gigabytes to 5 at a processing time of 3 hours and 10 minutes instead of 40 hours.

Illustrated in FIG. 2 are two examples of the number of program manipulators, program manipulator one 218 and program manipulator two 220. Program manipulator one 218 and program manipulator two 220 may each be an interface for viewing and receiving information from change server 216 as well as sending inputs to change server 216. Inputs, such as without limitation input 248 or input 250, to change server 216 may include changes to coding for imported baseline 222 formed in branches (such as without limitation branch 226, branch 228, and/or branch 230) self-generated within change server 216 responsive to inputs from program manipulator one 218 and program manipulator two 220. As represented in FIG. 2, input 248 or input 250 may without limitation, include any desired one, or combinations of, commands to create 256, query 258, update 260, or delete 262, items for master baseline 206.

As used with imported baseline 222, being persistent means that imported baseline 222 is stored once into change server 216 and not changed. Hence, the special programming of change server 216 represents an advance in computer architecture and functionality as compared to current servers. In contrast to currently used servers, change server 216 only requires persistent storage 308 space usage within change server 216, storage devices 316 for one copy of master baseline 206, and only requires the processing time, energy, bandwidth, and data volume required for a single import of the master baseline 206. Particularly when the master baseline 206 contains massive amounts of coding and required persistent storage 308 space usage within change server 216 and storage devices 316 for storage of the master baseline 206, the current change server 216 provides the technological improvement in the functioning of a computer server which, contrast to currently used servers, reduces the amount of persistent storage 308 space usage within change server 216 storage devices 316 required for change server 216, and by reducing the number of times and thus the volume of importing required, reduces data transfer requirements for executing changes and speeds up the processing time for inputting and executing the changes to master baseline 206.

Change server 216 is constructed so that no coding changes input for imported baseline 222 are executed directly in or on imported baseline 222. Hence, despite any changes generated in any branch in change server 216, instant roll back to view or interact with the persistent unchanged program coding of imported baseline 222 is always available.

Responsive to any request to change server 216 for a change to master baseline 206 as identically held in change server 216 as imported baseline 222, change server 216 is specially programmed with rules to self-generate a branch in change server 216 off imported baseline 222 that stores all code for the change to the imported baseline 222. Request for a change to the imported baseline 222 in change server 216 may come from any of the number of program manipulators, illustrated without limitation in FIG. 2 as program manipulator one 218 and program manipulator two 220. FIG. 2 illustrates that responsive to a number of different inputs, a number of different branches, such as, without limitation: branch 226, branch 228, and/or branch 230 have been self-generated in change server 216. Because all inputs that create, query, update, and/or delete, an item for imported baseline 222 are contained within the branches, imported baseline 222 remains persistent and unchanged. Hence, the persistent storage 308 space usage within change server 216 storage devices 316 required for storing the coding changes in change server 216 is significantly smaller as compared to current servers that copy and import an entire master baseline 206 to execute and store each change entered.

Branch integrator 244 includes specially programed algorithms that recognize at least a data format and data set schema of imported baseline 222, and using the data format and data set schema of imported baseline 222, formats the branch with a graph database ontology that forms inputs from program manipulators into a format and schema in the branch that will allow export, merger, or replay of the inputs within the branch directly onto master baseline 206 via a quick access graph database that avoids columnar or storage table formatting access time delays via use of uniform resource identifier coded quick access, within a tree structure of the graphic database format.

Change server 216 is configured with specially programmed rules that receive an input from program manipulators that contains a change for imported baseline 222, and locate, using a uniform resource identifier coding portion in imported baseline 222, to identify a portion of imported baseline 222 code that is the target of the change. As further explained below for FIG. 2, the identity of the target portion of imported baseline 222 then forms the seed upon which the change code is grown/formed to form/fill the branch. Branch growth may include coding to create/add new code at the target location of the imported baseline 222, to read a portion of imported baseline 222 at the target location, to update some portion of imported baseline 222 at the target location, and/or to delete some portion of imported baseline 222 at the target location.

In FIG. 2, branch 226 may represent any one of the type of changes mentioned above with the actual changes represented by code change 232. Without limitation, branch 226 may have been self-generated by change server 216 responsive to a change input received from program manipulator one 218 adding code by a manufacturer developing a new control unit for object 202. Similarly, branch 228 may represent any one of the type of changes mentioned above with the actual changes represented by code change 234. Without limitation, branch 228 may have been self-generated by change server 216 responsive to a change input from program manipulator two 220 adding code by an operator of object 202. Similarly, branch 230 may represent any one of the type of changes mentioned above with the actual changes represented by code change 236. Without limitation, branch 230 may have been self-generated by change server 216 responsive to a change input from any program manipulator with an authorized connection to change server 216 adding code by a supplier proposing a new control unit for object 202.

Further, coding within each branch will include uniform resource identifier coding that allows a program manipulator to address change to a target portion of a code change within a branch. As a non-limiting example, if a manufacturer gave supplier feedback requesting further changes to code change 236 in branch 230, then supplier could enter a change to change server 216 that locates within branch 230, and then uses target location identified within code change 236 as the seed for a new branch 238, which would form and save code change 240 that grows/forms branch 238. In other words, the branch graphic database tree formatting may generate branches from branches when change relationships make such further branching appropriate—thus adding another layer of efficiency in usage of persistent storage 308 space usage within change server 216 storage devices 316, increasing efficiency in export 252 of transfer volume and time as well as access and merger/replay time onto master baseline 206.

Hence, any number of program manipulators can simultaneously be working on changes to varying portions of imported baseline 222, or on alternative changes to a same portion of imported baseline 222, without interfering with each other's inputs, or delaying each other's inputs, or denying anyone of access to any portion of imported baseline 222 at any time. Similarly, any number of program manipulators can simultaneously be working on changes to varying portions of any one branch, such as, without limitation: branch 230, or on alternative changes to a same portion of any one branch, such as, without limitation: branch 230, without interfering with each other's inputs, or delaying each other's inputs, or denying anyone of access to any portion of any one branch, such as, without limitation: branch 230, at any time.

Further, the architecture and special coding of change server 216 streamlines and reduces processing time, persistent storage 308 and memory 306 space usage within change server 216 storage devices 316 requirements, and transfer volumes of coding and/or data when validating and integrating proposed changes to imported baseline 222. In current servers as shown in FIG. 1, when each change is loaded into a distinct copy of imported baseline and two distinct changes need to be merged or their cooperative interfacing be validated, a differencing algorithm must be run on each of the imported baselines to separate out the differences to be added together and run on a single copy of main baseline that can be run through code change validator 242. In contrast to current servers, change server 216 increases speed and flexibility of validation choices by reducing the steps that must be executed for validation, as well as volume of coding and data that must be processed while running a validation of selected code changes in selected branches.

Any of the number of program manipulators, such as, without limitation: program manipulator one 218 or program manipulator two 220, may direct branch integrator 244 to select which code change is going to be validated with imported baseline 222 by selecting which branches will be included in the validation.

Thus, as a non-limiting example, if one developer added change code 232 for a first portion of imported baseline 222 that interacts with a second portion of imported baseline 222 and a second developer added change code 234 for the second portion of imported baseline 222, and a validation is needed that change code 232 will run on imported baseline 222 and successfully interact with change code 234, then any authorized program manipulator can direct branch integrator 244 to run imported baseline 222 program through code change validator 240 interacting with either actual control unit 204 in object 202 or instead interacting with virtual control unit 246.

The novel structure and special coding of change server 216 will allow branch integrator to take identification of target code portions of imported baseline 222 that formed the seed for branch 226 and branch 228, and integrate with running of imported baseline 222 such that as the target code portions of imported baseline 222 are reached, the branch integrator 244 diverts imported baseline 222 to run the changes in the branch with that seed. Thus, through interaction with branch integrator 244, imported baseline 222 remains unchanged, yet is executed to interact with code change validator 242 and virtual control unit 246, or control unit 204, as though all of branch 226 code change 232 and all of branch 228 change code 234 are fully a part of imported baseline 222.

Thus, program manipulators also interface with branch integrator 244 to function as data viewers that can input queries to imported baseline 222 with application of selected branches as well. Hence, as an example and without limitation, program manipulator one 218 can query imported baseline 222 for an output and/or a view having selected branch integrator 244 to replay code change 232 of branch 226 onto imported baseline 222. Program manipulator one 218 can then make the same query, but having selected branch integrator 244 to replay code change 234 of branch 228 onto imported baseline 222, or replay code change 236 of branch 230 onto imported baseline 222, or any combinations thereof. Thereby, change server 216 provides a novel machine and process to evaluate the desirability or validate a functionality of applying any number of the change codes into a new master baseline.

Hence, any combination of change codes may be evaluated independently or in combination and interaction with any number of other change codes by a program manipulator selecting particular branches for inclusion in the validation—without altering or having to store an amended imported baseline 222. In that way, integration of a new system of control units for object 202 may be generated and evaluated before modifying master baseline 206. Generation or evaluation of any branch or combination thereof can thus be executed without affecting imported baseline 222 or master baseline 206. Likewise, any authorized program manipulator may elect to delete an entire branch from change server 216 storage without affecting the imported baseline 222 in persistent storage 308, or any other branch. Thereby, change server 216 provides the technical advantage of evaluating countless branches of create, read, update, and delete, changes from a single import of master baseline 206 and memory usage in change server 216 for only the one imported baseline 222 and the particular change code within each branch.

When some number of branches have been selected and are validated and designated as changes that should be applied to the master baseline, to generate a new or updated master baseline, then one of the program manipulators may send a command through branch integrator 244 to have the change code, respectively from each of the designated branches, sent to the import export server to be exported as export 252 to replay or merge into the master baseline 206 to form a new master baseline that will service object 202 via servicing control units, represented in FIG. 2 by control unit 204, therein.

Because each branch selected was grown from the seed of a uniform resource identifier that identifies the target portion of master baseline 206 code it affects, no differencing algorithm need be run to separate out differences in imported baseline 222 from master baseline 206 to apply the change codes to the master baseline 206. Thus, in contrast to current servers, a new master baseline may be efficiently generated by only exporting the selected branches and replaying them onto or merging them directly into master baseline 206. Thereby, the novel architecture of change server 216 not only reduces memory storage requirements as compared to current servers, but transfers and applies change code to form a new master baseline with less data transfer required, less steps, no requirement for any differencing algorithms, and thus in less time than current machines and methods for forming a new master baseline.

Additionally, dashed boxes in FIG. 2 illustrate, without limitation, that change server 216 and related elements may physically be joined within a common housing or location, or alternatively, separated but in communication with each other. In other words, without limitation, code validator 242 and virtual control unit 246 may physically and/or functionally cohabitate or be integrated into change server 216. Likewise, and without limitation, code validator 242, virtual control unit 246, and change server 216, may physically and/or functionally cohabitate or be integrated within computer server 254, which may incorporate program manipulator one 218 and program manipulator two 220.

Figure 3:
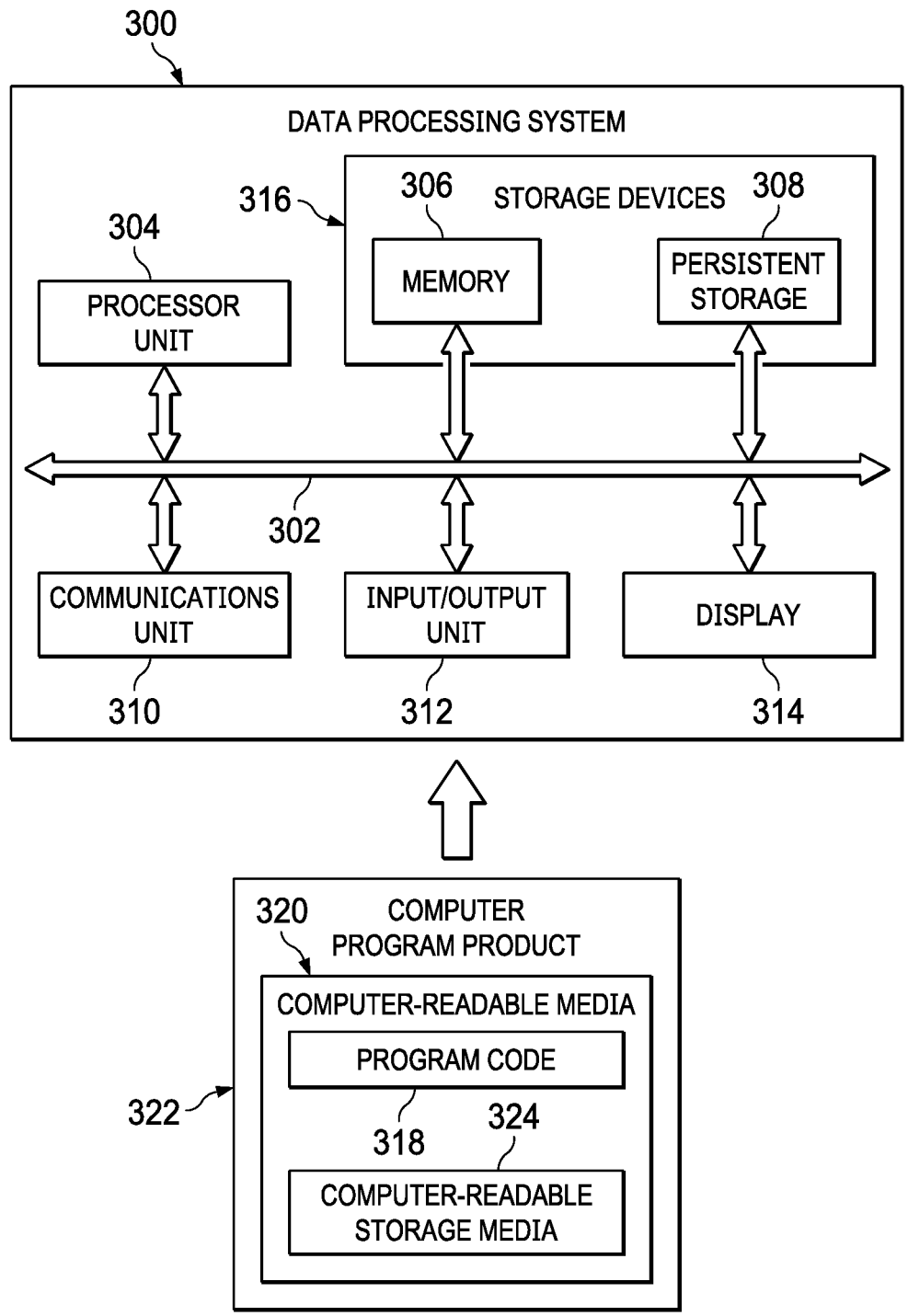
FIG. 3 is an illustration of a block diagram of an object manufacturing and service method in accordance with an illustrative embodiment.

Turning now to FIG. 3, an illustration of a block diagram of a data processing system is depicted in accordance with an illustrative embodiment. Data processing system 300 can be used to implement one or more data processing systems in object control system 200 in FIG. 2. Thus, without limitation, data processing system 300 may describe change server 216, master baseline 206, import export server 224 branch integrator 244, code change validator 242, program manipulator one 218, program manipulator two 220, control unit 204, virtual control unit 246, and/or combinations and/or association therewith. In this illustrative example, data processing system 300 includes communications framework 302, which provides communications between processor unit 304, memory 306, persistent storage 308, communications unit 310, input/output (I/O) unit 312, and display 314. In this example, without limitation, communications framework 302 takes the form of a bus system, such as, without limitation, a data bus.

Processor unit 304 serves to execute instructions for software that can be loaded into memory 306. Processor unit 304 includes one or more processors. For example, and without limitation, processor unit 304 can be selected from at least one of: a multicore processor, a central processing unit (CPU), a graphics processing unit (GPU), a physics processing unit (PPU), a digital signal processor (DSP), a data concentrator, a network processor, or some other suitable type of processor.

Memory 306 and persistent storage 308 are examples of storage devices 316. A storage device is any piece of hardware that is capable of storing information, such as, for example, and without limitation, at least one of: data, program code in functional form, or other suitable information either on a temporary basis, a permanent basis, or both on a temporary basis and a permanent basis. Storage devices 316 may also be referred to as computer-readable storage devices in these illustrative examples. Memory 306, in these examples, can be, for example, a random-access memory or any other suitable volatile or non-volatile storage device. Persistent storage 308 can take various forms, depending on the particular implementation. A technical advantage of change server 216 over current servers processing changes for interface control documents or master baselines for systems is a reduction in persistent storage 308 required to store and process changes input for master baseline 206 as well as a reduction in memory 306 needed to process and transfer changes stored in persistent storage 308 through branch integrator 244, code change validator 242, and/or to master baseline 206. Hence, required size of storage devices 316 may be reduced, or an amount of storage/memory available in storage device 316 for other operations may be increased via the new embodiments described herein.

For example, persistent storage 308 may contain one or more components or devices. For example, persistent storage 308 can be at least one of: a hard drive, a solid-state drive (SSD), a flash memory, a rewritable optical disk, a rewritable magnetic tape, or some combination of the above. The media used by persistent storage 308 also can be removable. Such as, a removable hard drive can be used for persistent storage 308.

Communications unit 310, in these illustrative examples, provides for communications with other data processing systems or devices. Communications with other data processing systems or devices may include transformation to other data formats and protocols connected to communications unit 310. Import export server 224, and/or branch integrator 244 may include or use communications unit 310. Without limitation, communications unit 310 may be a network interface card.

Input/output unit 312 allows for input and output of data with other devices that can be connected to data processing system 300. For example, input/output unit 312 can provide a connection for user input through at least one of: a keyboard, a mouse, or some other suitable input device. Further, input/output unit 312 can send output to a printer. Display 314 provides a mechanism to display information to a user. Program manipulators may include display 314.

Instructions, or rules, for at least one of the operating system, applications, or programs can be located in storage devices 316, which are in communication with processor unit 304 through communications framework 302. The processes of the different embodiments can be performed by processor unit 304 using computer-implemented instructions, which can be located in a memory, such as memory 306. For example, process may be performed by change server 216 in FIG. 2 and computer program product 322 in FIG. 3 can be implemented as instructions in program code 318.

These instructions may be referred to as program code 318, or alternatively referred to as: specially programmed code, computer usable program code, or computer-readable program code that can be read and executed by a processor in processor unit 304. The program code in the different embodiments can be embodied on different physical or computer-readable storage media, such as memory 306 or persistent storage 308.

Program code 318 is located in a functional form on computer-readable media 320 that is selectively removable and can be loaded onto or transferred to data processing system 300 for execution by processor unit 304 and/or communications unit 310. Program code 318 and computer-readable media 320 form computer program product 322 in these illustrative examples. In the illustrative example, computer-readable media 320 is computer-readable storage media 324.

In these illustrative examples, computer-readable storage media 324 is a physical or tangible storage device used to store program code 318 rather than a medium that propagates or transmits program code 318.

Alternatively, program code 318 can be transferred to data processing system 300 using a computer-readable signal media. The computer-readable signal media can be, for example, a propagated data signal containing program code 318, which can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 300 are not meant to provide architectural limitations to the manner in which different embodiments can be implemented. In some illustrative examples, one or more of the components may be incorporated in or otherwise form a portion of, another component. For example, memory 306, or portions thereof, can be incorporated in processor unit 304 in some illustrative examples. The different illustrative embodiments can be implemented in a data processing system including components in addition to or in place of those illustrated for data processing system 300. Other components shown in FIG. 3 can be varied from the illustrative examples shown. The different embodiments can be implemented using any hardware device or system capable of running program code 318.

Figure 4:
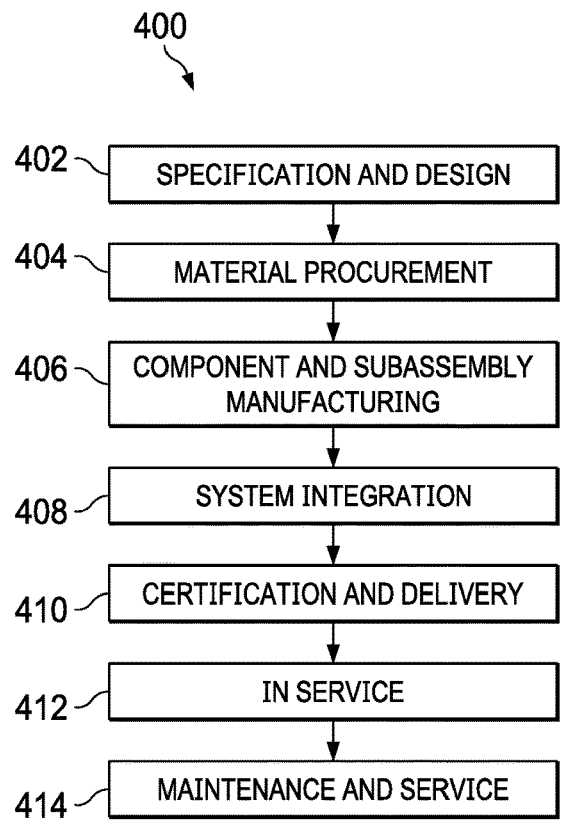
FIG. 4 is an illustration of a block diagram of an aircraft in which an illustrative embodiment may be implemented.
Figure 5:
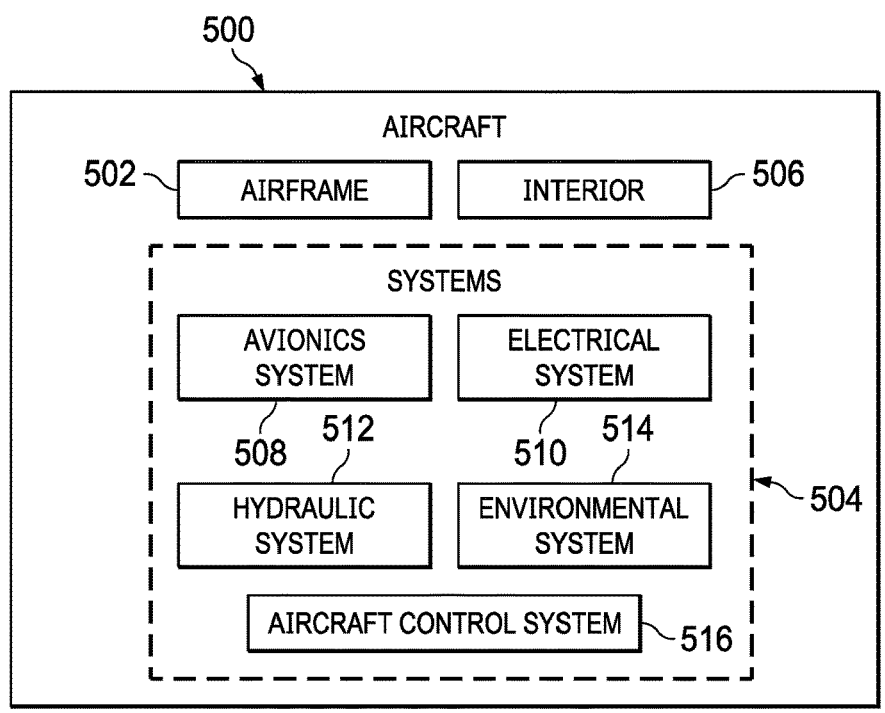
FIG. 5 is an illustration of a block diagram of a product management system in accordance with an illustrative embodiment.

Illustrative embodiments of the disclosure may be described in the context of object manufacturing and service method 400 as shown in FIG. 4 and implemented, without limitation when object 202 is an aircraft, such as aircraft 500 as shown in FIG. 5. Turning first to FIG. 4, an illustration of a block diagram of an object manufacturing and service method is depicted in accordance with an illustrative embodiment. During pre-production, object manufacturing and service method 400 may include specification and design 402 of aircraft 500 in FIG. 5 and material procurement 404.

During production, component and subassembly manufacturing 406 and system integration 408 of aircraft 500 in FIG. 5 takes place. Thereafter, aircraft 500 in FIG. 5 can go through certification and delivery 410 in order to be placed in service 412. While in service 412 by a customer, aircraft 500 in FIG. 5 is scheduled for routine maintenance and service 414, which may include, without limitation: modification, reconfiguration, refurbishment, updating including changes that create, read, update, and/or delete programming for a control unit 204 for object 202 which may be aircraft 500 or a part thereof, and other maintenances or services.

Each of the processes of object manufacturing and service method 400 may be performed or carried out by a system integrator, a third party, an operator, or some combination thereof. In these examples, the operator may be a customer.

For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 5, an illustration of a block diagram of an aircraft is depicted in which an illustrative embodiment may be implemented. In this example, aircraft 500 is illustrative of any object 202 that may contain control unit 204 to operate any of a number of systems on object 202 that may require configuration, interface, and support, as produced by object manufacturing and service method 400 in FIG. 4. Hence, object 202 may include a structure represented by airframe 502 with plurality of systems 504 and, interior 506. Examples of systems 504 include one or more of avionics system 508, electrical system 510, hydraulic system 512, environmental system 514, and aircraft control system 516. Aircraft control system 516 may include a control unit over other control units in object 202 and may be implemented using components such as those depicted for control unit 204 in FIG. 2. Any number of other systems may be included. Further, as described above for FIG. 2, each system on aircraft 500 may have a dedicated control unit 204. Although an aerospace example is shown, different illustrative embodiments may be applied to other industries, such as the automotive industry.

Apparatuses and methods embodied herein may be employed during at least one of the stages of aircraft manufacturing and service method 400 in FIG. 4. For example, aircraft control system 516 in FIG. 5 can be implemented in aircraft 500 during system integration 408. As another example, control unit 204 in FIG. 2 can be a software aircraft part loaded into the computer system in aircraft 500 during maintenance and service 414. This improvement to aircraft 500 can be performed during at least one of modification, reconfiguration, refurbishment, and other maintenance or service during maintenance and service 414.

In one illustrative example, components or subassemblies produced in component and subassembly manufacturing 406 in FIG. 4 can be fabricated or manufactured in a manner similar to components or subassemblies produced while aircraft 500 is in service 412 in FIG. 4. As yet another example, one or more apparatus embodiments, method embodiments, or a combination thereof can be utilized during production stages, such as component and subassembly manufacturing 406 and system integration 408 in FIG. 4. One or more apparatus embodiments, method embodiments, or a combination thereof may be utilized while aircraft 500 is in service 412, during maintenance and service 414 in FIG. 4, or both. The use of a number of the different illustrative embodiments may substantially expedite the design, delivery schedule for, and/or assembly of aircraft 500 or parts thereof, reduce the cost of aircraft 500 or parts thereof, or both expedite design, delivery schedule for, and/or the assembly of aircraft 500 or parts thereof and reduce the cost of aircraft 500 or parts thereof.

For example, the use of an aircraft control system as described in the illustrative examples can reduce, without limitation, the amount of: development time for, wiring, components, and other devices needed to assemble aircraft 500 or parts thereof. This reduction can reduce the amount of time and cost involved in design and/or manufacturing aircraft 500 or parts thereof.

Figure 6:
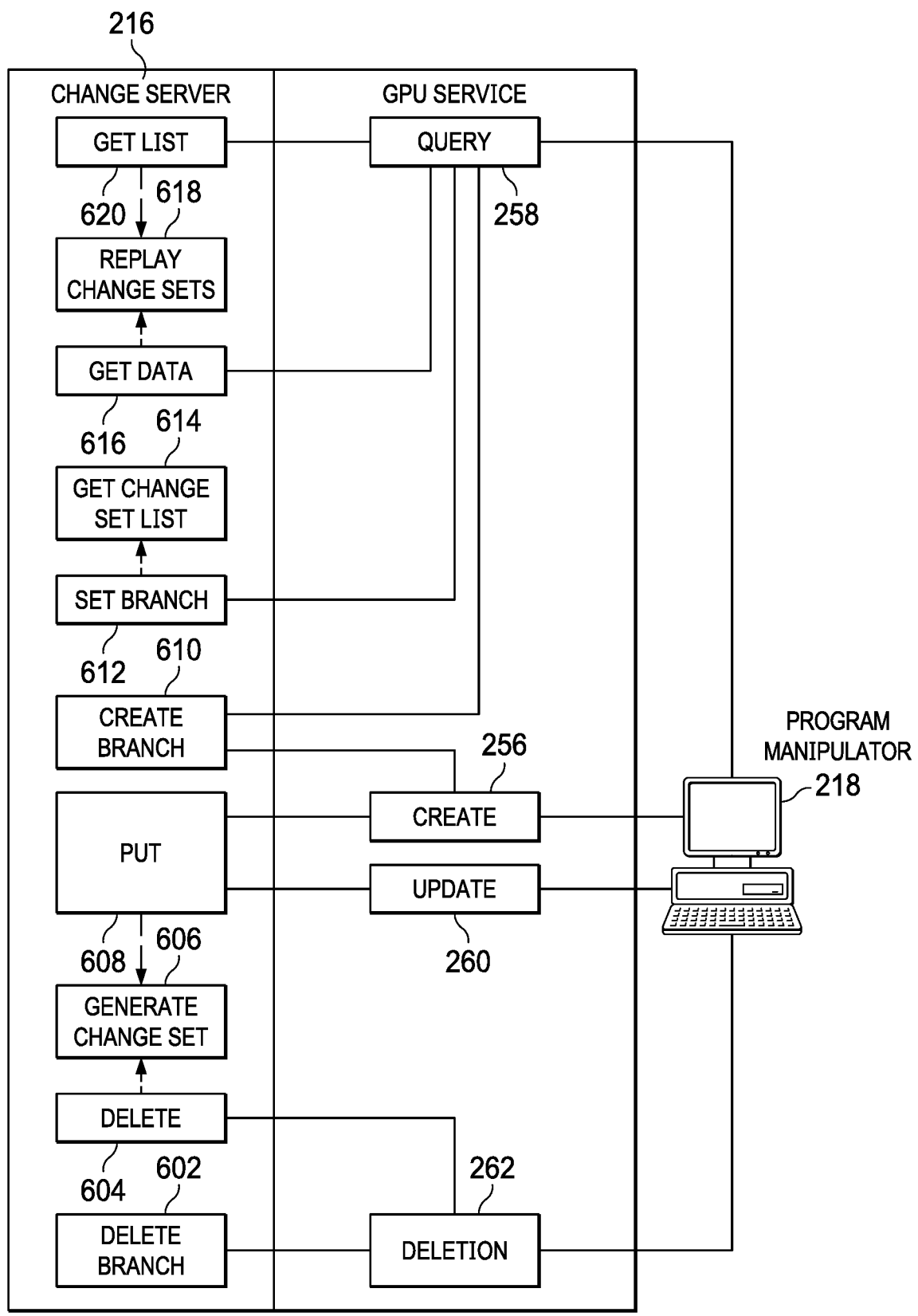
FIG. 6 is an illustration of use case of a self-generated branch in accordance with an illustrative embodiment.

Turning next to FIG. 6, which is an illustration of a use case of a self-generated branch in accordance with an illustrative embodiment. More specifically, an embodiment for a use case summary is illustrated for change server 216 receiving create 256, update 260, query 258, or deletion 262 inputs from program manipulator 218, and responding via generating actions for delete branch 602, delete 604, generate change set 606, put 608, create branch 610, set branch 612, get change set list 614, get data 616, replay change sets 618, and get list 620. Program manipulator 218 may communicate with change server 216 through a general-purpose unit service (GPU service). In FIG. 6, program manipulator 218 is representative of any number of program manipulators that may be connected to provide inputs to change server 216. In other words, program manipulator 218 in FIG. 6 represents that change server 216 may receive and process a number of inputs simultaneously from a number of program manipulators.

Thus, responsive to create 256 input, change server 216 may generate create branch 610 for new content for master baseline 206 or may execute put 608 and generate change set 606 for an existing branch. Similarly, responsive to update 260 input, change server 216 may generate create branch 610 if update 260 expands on existing coding of master baseline 206 or set branch 612 and get change set list 614 if altering existing coding of master baseline 206. Change server 216 may also process update 260 into put 608. Further, put 608 may also connect into generate change set 606.

As described for FIG. 2 above, change server 216 generations may be influenced by branch integrator 244 based upon specific ontology of master baseline 206. Thus, if change server 216 receives an identical input, but when working with one particular master baseline 206 that has a different data format or schema than a second master baseline 206, the particular formatting of change server 216 generated create branch 610, generate change set 606, or other responses by change server 216 for the particular master baseline 206 will be uniquely formatted to optimize quick access onto the particular master baseline 206 as compared to the formatting of change server 216 generated create branch 610, generate change set 606 or other responses by change server 216 for the second master baseline 206.

Continuing with the use case illustrated by FIG. 6, responsive to deletion 262 input, change server 216 may generate delete branch 602 for an existing branch for new content for master baseline 206 or may execute delete 604 and generate change set 606. Similarly, responsive to query 258 input, change server 216 may generate: get list 620 and replay change sets 618, or get data 616 and replay change sets 618 for queries to existing coding of master baseline 206. For queries to items in branches, responsive to query 260 input, change server 216 may generate or set branch 612 and get change set list 614.

Hence, embodiments above and below describe at least a machine that includes: a change server specially programmed to service a master baseline, such that the change server comprises a memory that comprises a first code configured to respond to an input with a generation of a branch from an imported baseline within the change server. The master baseline comprises other code specially programmed to service multiple control units. The branch is configured to generate and store a code change that comprises at least one of: a creation, an update, or a deletion, to the imported baseline. The branch is configured to minimize an amount of a persistent storage required. The branch is configured to minimize an amount of and a processing time for an export from the branch to the master baseline. The export includes the code change and excludes the imported baseline and an output from a differences analyzer.

The change server includes the imported baseline and an import/export server in communication with the master baseline. The distinct from and in communication with the imported baseline. The imported baseline serves as a specially programmed singular surrogate for the master baseline and is in communication with every branch generated by the change server. Each branch resides within the persistent storage within the change server.

Therefore, the branch is configured to minimize a time required to retrieve the master baseline and store the imported baseline; and the generation is a self-generation by and within the change server. The change server and a code change validator may reside within a computer server. The creation, a query, the update, and the deletion may be received by the change server from a program manipulator.

The multiple control units may be located in an object including, without limitation: a building, and a vehicle. The vehicle may be, without limitation, an aircraft.

In other words, a designer uses a program manipulator that imports a single copy of a master baseline into a change server that retains and uses the single copy as an imported copy that is used for generating branches creating and storing data generated responsive to queries, changes, creations, and deletions, from the program manipulator for analysis, validation, and eventually replay onto the master baseline. Master baseline data sets may include code specially programmed for, without limitation, allocation, configuration, and analysis, operations for a number of control units.

The branches contain change items that provide add, remove, and update operations to both the data values and relationships of the imported baseline. Hence, during use of the change server, until export to the master baseline, the master baseline itself remains read-only and unchanged. During design or modification of programs for a control unit, desired data can be pulled from the imported baseline and change item updates are replayed onto the returned results.

Figure 7:
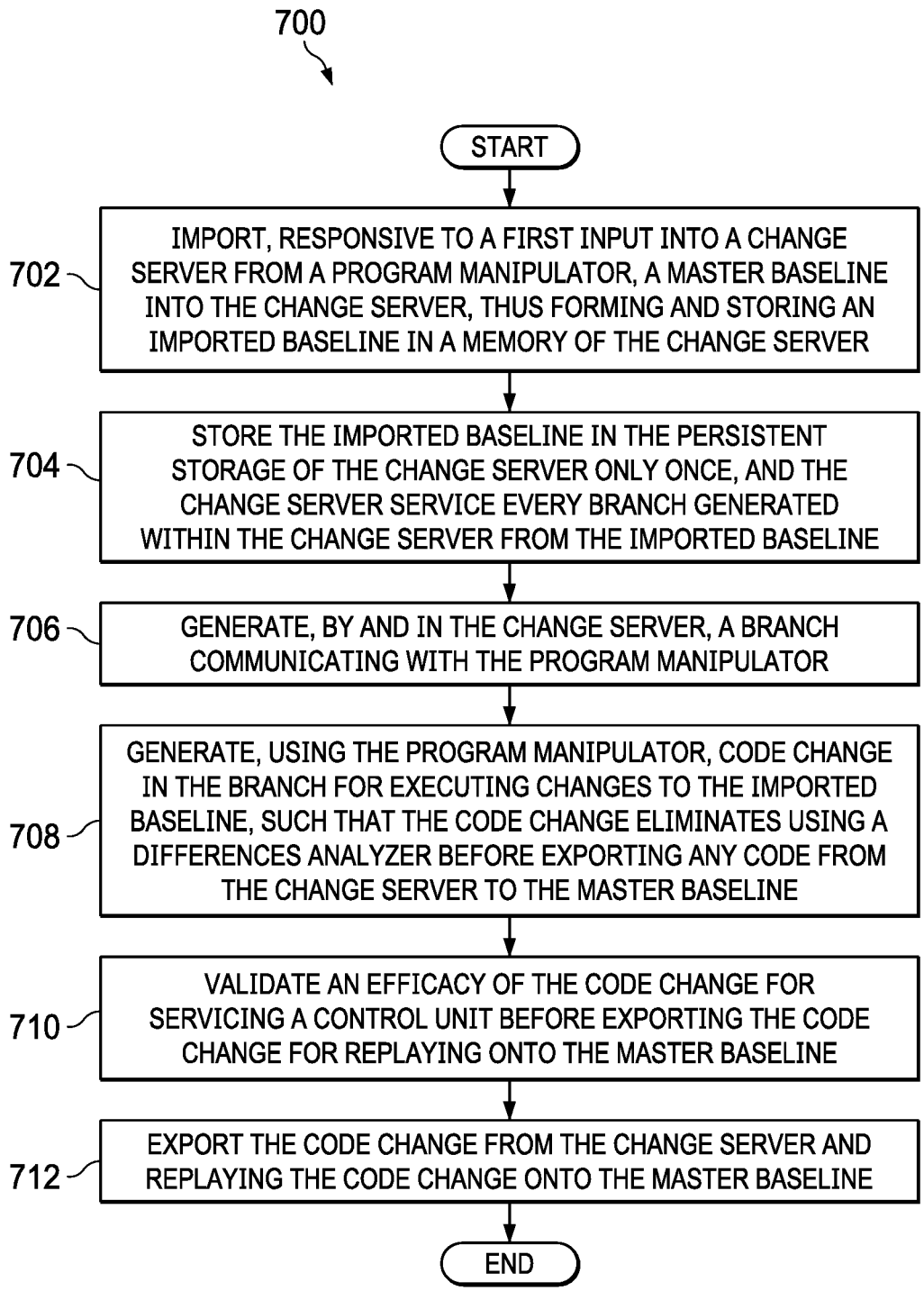
FIG. 7 is an illustration of a flowchart of a process for reducing persistent storage required in a storage device for a computer server in accordance with an illustrative embodiment.

FIG. 7 is an illustration of a flowchart of a process for reducing persistent storage required in a storage device for a computer server in accordance with an illustrative embodiment. More specifically, FIG. 7 shows process 700 for reducing persistent storage required in a storage device for a computer server. Process 700 includes importing, responsive to a first input into a change server from a program manipulator, a master baseline into the change server, thus forming and storing an imported baseline in a memory of the change server (operation 702). The change server may be in communication with a control unit configured for service by the master baseline. Process 700 also includes storing the imported baseline in the persistent storage of the change server only once, and the imported baseline servicing every branch generated within the change server (operation 704).

Process 700 includes generating, by and in the change server, a branch communicating with the program manipulator (operation 706). The change server may also generate, responsive to a second input from a second program manipulator, a second branch serviced by the imported baseline.

Process 700 includes generating, using the program manipulator, code change in the branch for executing changes to the imported baseline, such that the code change eliminates using a differences analyzer before exporting any code from the change server to the master baseline (operation 708). The change code includes at least one of: a creation, an update, or a deletion, for the master baseline.

Process 700 may also include validating an efficacy of the code change for servicing a control unit before exporting the code change for replaying onto the master baseline (operation 710). Process 700 also includes exporting the code change from the change server and replaying the code change onto the master baseline (operation 712).

Thus, the illustrative embodiments provide at least a machine and process for reducing persistent storage required in a storage device for a computer server in accordance with an illustrative embodiment. The process includes importing, responsive to a first input into a change server from a program manipulator, a master baseline into the change server, thus forming and storing an imported baseline in a memory of the change server. The process includes generating, by and in the change server, a branch communicating with the program manipulator. The process includes generating, using the program manipulator, code change in the branch for executing changes to the imported baseline. The process includes exporting the code change from the change server and replaying the code change onto the master baseline.

The change server is in communication with a control unit configured for service by the master baseline. The code change provides the technical advancement of eliminating using a differences analyzer before exporting any code from the change server to the master baseline.

The imported baseline is stored in the persistent storage of the change server only once, and thereby enables servicing every branch generated within the change server. The code change includes at least one of: a creation, a query, an update, or a deletion, for the master baseline.

The process for reducing storage required in a storage device of a computer server further includes validating an efficacy of the code change for servicing a control unit before exporting the code change for replaying onto the master baseline. The process for reducing storage required in a storage device of a computer server further includes as well, the change server generating, responsive to a second input from a second program manipulator, a second branch serviced by the imported baseline.

Figure 8:
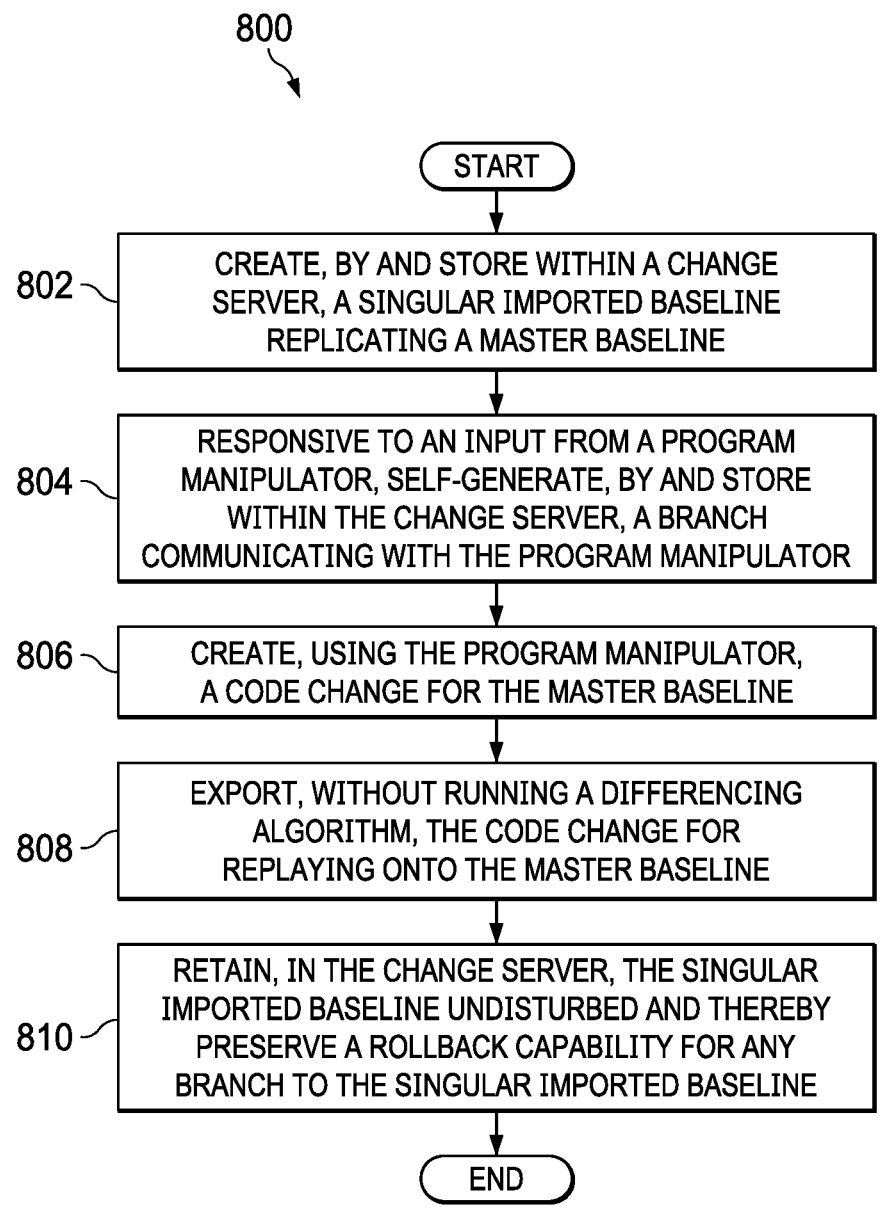
FIG. 8 is an illustration of a flowchart of a process for an export from a change server to a master baseline servicing multiple control units for an object in accordance with an illustrative embodiment.

FIG. 8 is an illustration of a flowchart of a process for reducing an export from a change server to a master baseline servicing multiple control units for an object in accordance with an illustrative embodiment. More specifically, FIG. 8 shows process 800 for reducing an export from a change server to a master baseline servicing multiple control units for an object. Process 800 includes creating, by and storing within the change server, a singular imported baseline replicating the master baseline (operation 802). Process 800 includes, responsive to an input from a program manipulator, self-generating, by and storing within the change server, a branch communicating with the program manipulator (operation 804).

Process 800 also includes creating, using the program manipulator, a code change for the master baseline (operation 806). The code change includes at least one of: a creation, an update, or a deletion, for the master baseline. Process 800 also includes exporting only the code change for replaying onto the master baseline (operation 808). Process 800 also includes retaining the singular imported baseline undisturbed and thereby preserving a roll-back capability for any branch to the singular imported baseline (operation 810).

Thus, the illustrative embodiments provide at least a machine and process for a process for reducing an export from a change server to a master baseline servicing multiple control units for an object. The process includes creating, by and storing within the change server, a singular imported baseline replicating the master baseline. Responsive to an input from a program manipulator, the process includes self-generating, by and storing within the change server, a branch communicating with the program manipulator.

The process for reducing an export from a change server to a master baseline servicing multiple control units for an object also includes creating, using the program manipulator, a code change for the master baseline, and exporting, without running a differencing algorithm, the code change for replaying onto the master baseline. The code change includes at least one of: a creation, a query, an update, or a deletion, for the master baseline. The process also includes the change server retaining the singular imported baseline undisturbed and thereby preserving a roll-back capability for any branch to the singular imported baseline.

Further, as used herein, a first component "connected to" a second component means that the first component can be connected directly or indirectly to the second component. Connection can be physically, electronically, and/or without limitation via communication. In other words, additional components may be present between the first component and the second component. The first component is considered to be indirectly connected to the second component when one or more additional components are present between the two components. When the first component is directly connected to the second component, no additional components are present between the two components.

Additionally, as depicted, change server 216 can be implemented in at least one of software or hardware. When software is used, the operations performed by change server 216 may be implemented in program code configured to run on hardware, such as a processor unit. When firmware is used, the operations performed by change server 216 may be implemented in program code and data and stored in persistent memory to run on a processor unit. When hardware is employed, the hardware may include circuits that operate to perform the operations in change server 216.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors. An organic semiconductor is a semiconductor that is comprised of materials such as pi-bonded molecules or polymers made of carbon and hydrogen and may include other elements such as nitrogen, sulfur, and oxygen. These materials are in the form of molecular crystals or amorphous thin films.

Object control system 200 represents a physical hardware system and includes one or more data processing systems. When more than one data processing system is present, those data processing systems are in communication with each other using a communications medium. The communications medium may, without limitation, be a network or a data bus. The data processing systems may be selected from at least one of a computer, a server computer, a tablet, or some other suitable data processing system.

The illustration of object control system 200 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented as part of object control system 200.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a method, apparatus, and system that provide a technical solution, based upon a practical application for generating or modifying utilities for a control unit in an object, which overcomes the technical problems of excessive requirements and use of storage in a memory and time and volume for transmission of data to update a master baseline. The master baseline may be serving as an interface control document managing utilities servicing the control unit that controls a function in an object. Validation, export, and replay of the branch onto the master baseline eliminate a need for use of running exports to the master baseline through a differences analyzer.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A machine that comprises:
a change server specially programmed to service a master baseline, such that the change server comprises a memory that comprises a branch integrator that comprises a first code configured to respond to an input with a generation of a branch formatted in a graph database ontology, the branch integrator configured to:
store an imported baseline that remains singular regardless of a number of branches associated with the master baseline;
recognize a data set schema of the imported baseline; and
generate and store a code change within the branch that comprises at least one of: a creation, an update, or a deletion, to the imported baseline, wherein the code change comprises a format and schema configured, based upon the graph database ontology, to: export, merge, or replay, the branch directly onto the master baseline.

2. The machine of claim 1, further comprising:
the change server comprising the imported baseline and an import/export server in communication with the master baseline;
the change server configured to reduce, as compared to a change server devoid of the branch integrator, by a multiple equal to the number of branches, an amount of data transferred and a processing time for an export of the number of branches to the master baseline; and
the branch being distinct from and in communication with the imported baseline.

3. The machine of claim 2, further comprising the imported baseline being a specially programmed singular surrogate, for the master baseline, in a persistent storage within the change server and in communication with the number of branches generated by the change server.

4. The machine of claim 2, wherein the export comprises the code change and excludes the imported baseline and an output from a differences analyzer.

5. The machine of claim 1, further comprising:
the branch configured to minimize a time required to retrieve the master baseline and store the imported baseline; and
the generation being a self-generation by and within the change server.

6. The machine of claim 1, further comprising a computer server that comprises:
the change server and a code change validator.

7. The machine of claim 1, further comprising the creation, the update, and the deletion being received from a program manipulator.

8. The machine of claim 1, wherein the master baseline comprises a code specially programmed to service multiple control units.

9. The machine of claim 8, further comprising the multiple control units being located in one of: a building, and a vehicle.

10. The machine of claim 9, wherein the vehicle is an aircraft.

11. A process for reducing persistent storage required in a storage device for a computer server, the process comprising:
importing, responsive to a first input into a change server from a program manipulator, a master baseline into the change server, thus forming and storing an imported baseline that remains singular regardless of a number of branches associated with the master baseline in a memory of the change server;
recognizing, by a branch integrator in the change server, a data set schema of the imported baseline;
generating, by the branch integrator in the change server, a branch formatted in a graph database ontology and communicating with the program manipulator;
generating, using the program manipulator, a code change, comprising a format and schema using the graph database ontology, in the branch for executing changes to the imported baseline; and
exporting the code change from the change server and replaying the code change onto the master baseline.

12. The process of claim 11, further comprising the change server communicating with a control unit configured for service by the master baseline.

13. The process of claim 11, further comprising the code change eliminating using a differences analyzer before exporting any code from the change server to the master baseline.

14. The process of claim 11, further comprising storing the imported baseline in the persistent storage of the change server only once, and the imported baseline servicing a number of branches generated within the change server.

15. The process of claim 11, further comprising the code change comprising at least one of: a creation, an update, or a deletion for the master baseline.

16. The process of claim 11, further comprising validating an efficacy of the code change for servicing a control unit before exporting the code change for replaying onto the master baseline.

17. The process of claim 11, further comprising the change server generating, responsive to a second input from a second program manipulator, a second branch serviced by the imported baseline.

18. A process for reducing an export from a change server to a master baseline servicing multiple control units for an object, the process comprising:
creating, by and storing within the change server, an imported baseline replicating the master baseline, wherein the imported baseline remains singular regardless of a number of branches associated with the master baseline;
recognizing, by a branch integrator in the change server, a data set schema of the imported baseline;
responsive to an input from a program manipulator, self-generating, by and storing within the change server, a branch formatted in a graph database ontology and communicating with the program manipulator;
creating, using the program manipulator, a code change comprising a format and schema using the graph database ontology for the master baseline; and
exporting, without running a differencing algorithm, the code change for replaying onto the master baseline.

19. The process of claim 18, further comprising the code change comprising at least one of: a creation, an update, or a deletion for the master baseline.

20. The process of claim 18, further comprising the change server retaining the imported baseline undisturbed and thereby preserving a roll-back capability for the branch formatted in the graph database ontology to the imported baseline.

\* \* \* \* \*